United States Patent
Dalzell et al.

(10) Patent No.: US 11,661,109 B2
(45) Date of Patent: May 30, 2023

(54) MOTOR VEHICLE WITH TURN SIGNAL-BASED LANE LOCALIZATION

(71) Applicant: GM GLOBAL TECHNOLOGY OPERATIONS LLC, Detroit, MI (US)

(72) Inventors: Haley M. Dalzell, Ann Arbor, MI (US); Andrew C. Huster, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/237,092

(22) Filed: Apr. 22, 2021

(65) Prior Publication Data

US 2022/0355864 A1 Nov. 10, 2022

(51) Int. Cl.
*B62D 15/02* (2006.01)
*B60Q 1/34* (2006.01)

(52) U.S. Cl.
CPC ......... *B62D 15/0255* (2013.01); *B60Q 1/343* (2013.01)

(58) Field of Classification Search
CPC ............................. B62D 15/0255; B60Q 1/343
See application file for complete search history.

(56) References Cited

U.S. PATENT DOCUMENTS

| | | | |
|---|---|---|---|
| 9,555,803 B2 * | 1/2017 | Pawlicki | G06V 20/582 |
| 9,654,738 B1 * | 5/2017 | Ferguson | H04N 7/18 |
| 10,997,800 B1 * | 5/2021 | Salodkar | G06Q 40/08 |
| 11,203,344 B2 * | 12/2021 | Bowyer | B60W 60/00274 |
| 2012/0277957 A1 * | 11/2012 | Inoue | B60W 30/12 701/41 |
| 2013/0038437 A1 * | 2/2013 | Talati | G06Q 10/10 340/438 |
| 2014/0195138 A1 * | 7/2014 | Stelzig | G08G 1/0116 701/119 |
| 2015/0268665 A1 * | 9/2015 | Ludwick | B60Q 5/008 701/23 |
| 2016/0091609 A1 * | 3/2016 | Ismail | G01S 19/49 702/150 |
| 2016/0257308 A1 * | 9/2016 | Pawlicki | B62D 15/025 |

(Continued)

FOREIGN PATENT DOCUMENTS

| | | | | |
|---|---|---|---|---|
| DE | 112010005318 T5 * | 12/2012 | ............ | B60W 30/12 |
| DE | 102013016596 A1 * | 4/2014 | ............ | B60W 40/10 |
| JP | 2006023278 A * | 1/2006 | ......... | G01C 21/3655 |

*Primary Examiner* — Redhwan K Mawari
(74) *Attorney, Agent, or Firm* — Quinn IP Law

(57) ABSTRACT

A method increases fidelity of a lane localization function aboard a motor vehicle by receiving input signals indicative of a relative position of the vehicle with respect to a roadway. The input signals include GPS and geocoded mapping data, and an electronic turn signal indicative of activation of the turn signal lever. Sensor-specific lane probability distributions are calculated via the lane localization function using the input signals. The various distributions are fused via the localization function to generate a host lane assignment. The host lane assignment corresponds to a lane of the roadway having a highest probability among a set of possible lane assignments. An autonomous steering control action is performed aboard the motor vehicle using an Advanced Driver Assistance System (ADAS) in response to the host lane assignment. A motor vehicle has a controller that performs the method, e.g., by executing instructions from computer-readable media.

20 Claims, 4 Drawing Sheets

(56) References Cited

U.S. PATENT DOCUMENTS

| | | | |
|---|---|---|---|
| 2018/0046196 A1* | 2/2018 | Hashimoto | G05D 1/0223 |
| 2018/0053060 A1* | 2/2018 | Huang | G01S 5/16 |
| 2019/0265042 A1* | 8/2019 | Prasad | G01C 21/3844 |
| 2020/0285233 A1* | 9/2020 | Hafner | B60W 60/0055 |
| 2021/0284162 A1* | 9/2021 | Parks | B60W 50/082 |
| 2021/0402998 A1* | 12/2021 | Inoue | B60W 40/04 |

* cited by examiner

MOTOR VEHICLE WITH TURN SIGNAL-BASED LANE LOCALIZATION

INTRODUCTION

The present disclosure relates to methods and systems for increasing the fidelity of an autonomous lane localization function aboard a motor vehicle. Motor vehicles often come equipped with lane localization systems having logic and associated hardware. Working together, such systems facilitate responsive dynamic steering control actions. Modern lane localization systems tend to be highly reliant on digital geospatial mapping data and real-time GPS information when determining a motor vehicle's present location. Autonomous steering control decisions may also be informed by data from ever-evolving vision systems such as video cameras, radar and/or lidar sensors, and the like. Boundaries of paved road surfaces are usually demarcated by detectable broken-line or solid-line lane markings. Onboard processing of a variety of real-time lane localization data enables an onboard controller to interpret the surrounding environment and make informed control decisions, such as when automatically adjusting a steering angle to maintain the motor vehicle's current lane position or change lanes.

As understood in the art, lane localization functions employed by an Advanced Driver Assistance System (ADAS) of a modern day motor vehicle utilize a suite of onboard sensors to collect different data types, with the collected data collectively describing the surrounding environment. Lane localization functions also enable a driver of the motor vehicle to selectively offload certain driving tasks to the onboard controller. In the context of automated lane keeping/centering, for instance, relevant data includes the above-noted GPS-informed/geocoded locations of detected lane markings and other road surface boundaries. The controller continuously calculates a level of error between the present position/heading of the motor vehicle and a trajectory of the detected lane markings, and responds with autonomous steering control signals to produce a situation-appropriate steering response. Lane change assist systems likewise use the detected lane markings and other available sensor inputs to inform an autonomous steering maneuver when departing a current lane, e.g., when passing another vehicle, while turning, or when merging onto an offramp at a highway exit.

SUMMARY

The present disclosure pertains to the real-time operational control of a motor vehicle or another mobile platform using a lane localization function of the type generally noted above. Automatic lane centering, lane change assist, and other Advanced Driver Assistance System (ADAS)-executed control functions rely on a lane localization algorithm and associated hardware. However, such algorithms tend to be heavily dependent on lateral GPS accuracy when making a host lane assignment, i.e., when identifying a particular roadway lane within which the motor vehicle is presently traveling. GPS data has built-in error, and therefore an incorrect host lane assignment based solely or primarily on GPS data may lead to a suboptimal steering control performance.

Unlike traditional lane localization approaches, the present methodology incorporates an ON/OFF position and corresponding directional state ("turn signal state") of a turn signal lever as an additional lane localization input. Associated logic enabled by various electrooptical video cameras, remote sensing devices such as radar and/or lidar systems, digital mapping data, etc., are also used to reduce instances of false or inadvertent turn signal indications, thereby increasing overall fidelity and robustness of the disclosed solution.

In a particular embodiment, a method for increasing fidelity of a lane localization function aboard a motor vehicle having a turn signal lever includes receiving input signals indicative of a relative position of the motor vehicle with respect to a roadway, which occurs via an onboard controller. The received input signals include GPS data and geocoded mapping data. In response to a set of enabling conditions, the method further includes receiving an electronic turn signal as an additional component of the input signals. The electronic turn signal is indicative of a present activation state of the turn signal lever, i.e., an indication of an impending right-hand or left-hand turn. Multiple sensor-specific lane probability distributions are then calculated via the lane localization function. This statistical calculation occurs using each of the input signals inclusive of the electronic turn signal.

Thereafter, the present method includes automatically fusing the various lane probability distributions, once again using the lane localization function, to thereby generate a host lane assignment of the motor vehicle. The host lane assignment corresponds to a lane of the roadway having a highest probability among a set of possible lane assignments. The controller, via operation of an ADAS, then executes an autonomous steering control action aboard the motor vehicle in response to the host lane assignment, thus changing the dynamic state of the motor vehicle.

The motor vehicle in some configurations may include a video camera configured to collect real-time video image data of the roadway. In such an embodiment, the input signals include the real-time video image data.

The method may also include determining a lane marker type, via the controller, using the real-time video image data of the roadway. The enabling conditions in this particular instance may include a predetermined "crossable" lane marker type on a side of a lane matching a direction of the turn signal, e.g., a broken or dashed line demarcating a crossable boundary of a given lane in accordance with prevailing traffic laws.

The motor vehicle in other embodiments may include a remote sensing system configured to collect radar data and/or lidar data of the roadway, with the input signals including the radar data and/or the lidar data.

The method may include automatically fusing the radar data and/or the lidar data with the video image data using an object fusion logic block of the controller, or fusing the radar data with the lidar data.

In an exemplary non-limiting embodiment of the present method, the lane localization function includes a Markov localization function. Calculating the plurality of lane probability distributions in this instance includes using the Markov localization function.

The enabling conditions contemplated herein may also include a lane change value indicative of an elapsed time since a last-detected lane change in a direction of the turn signal and/or an elapsed time since the turn signal has been set in a particular direction.

In an aspect of the disclosure, the method includes determining a driver attention score via the controller. In this particular scenario, the enabling conditions may include the driver attention score exceeding a calibrated threshold attention score.

The enabling conditions may also include a look-ahead value indicative of an existence of and/or an estimated width of an upcoming lane of the roadway, e.g., as reported to the controller from external applications, the mapping data, crowdsourced apps, etc.

Executing an autonomous steering control action may include executing one or more of a lane centering control maneuver, a driver-requested automatic lane change maneuver, and/or a controller-initiated automatic lane change maneuver.

A motor vehicle is also described herein as having a set of (one or more) road wheels connected to a vehicle body, a turn signal lever, an ADAS configured to control a dynamic state of the motor vehicle based on a host lane assignment, and a controller. The controller in turn is configured to execute instructions for increasing fidelity of an autonomous lane localization function aboard the motor vehicle using turn signals, with the turn signals generated by activation of the turn signal lever. This occurs via execution of the above-summarized method.

Also disclosed herein is a computer-readable medium on which is recorded instructions for selectively increasing fidelity of an autonomous lane localization function aboard a motor vehicle having a turn signal lever. The instructions are selectively executed by a processor of the motor vehicle in response to the enabling conditions to thereby cause the processor to execute the present method in its different disclosed embodiments.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

DETAILED DESCRIPTION

Figure 1:
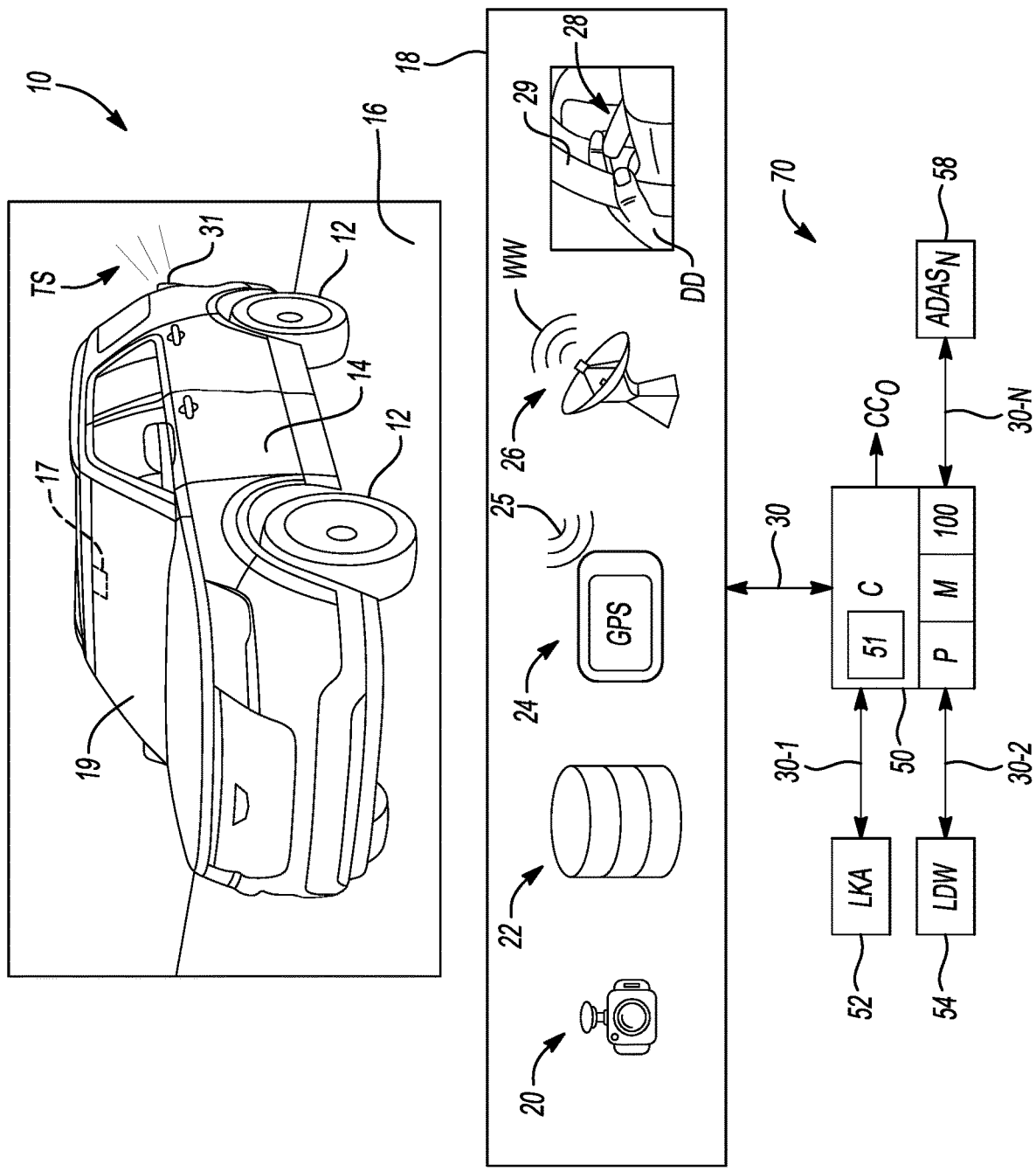
FIG. 1 is a schematic illustration of a representative motor vehicle configured with turn signal-based lane localization logic in accordance with the present disclosure.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figure 3:
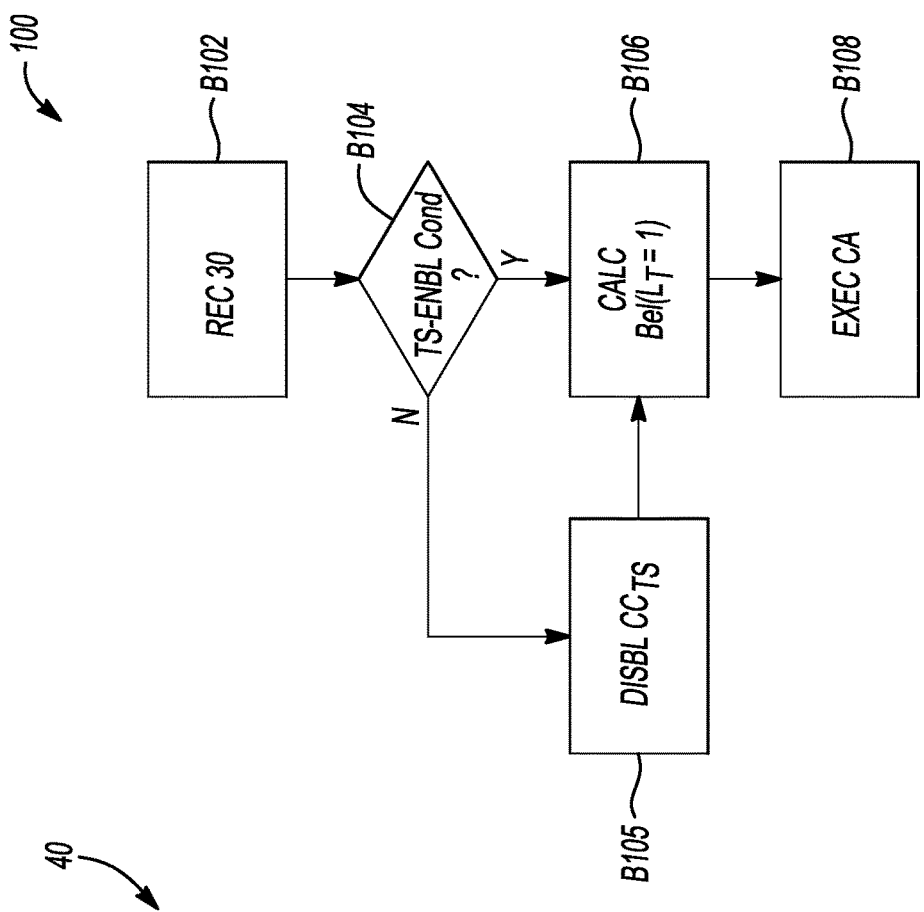
FIG. 3 is a flow chart describing an exemplary embodiment of a method in accordance with the present disclosure.

Referring to the drawings, wherein like reference numbers refer to like features throughout the several views, a motor vehicle 10 is depicted in FIG. 1 having a controller (C) 50 programmed to execute a method 100. Execution of computer-readable instructions embodying the method 100, an embodiment of which is shown in FIG. 3 and described in detail below, enables the controller 50 to selectively increase fidelity of an onboard lane localization function 51 by situationally incorporating a driver-initiated turn signal ON/OFF and directional state ("turn signal state") into its lane probability calculations. Increased fidelity in the present teachings refers to the improved accuracy of lane localization predictions relative to an actual position of the motor vehicle, relative to approaches that do not incorporate turn signal information as set forth herein.

For illustrative simplicity, select components of the motor vehicle 10 are shown and described while other components are omitted. In the depicted representative embodiment of FIG. 1, the motor vehicle 10 includes road wheels 12 positioned with respect to a vehicle body 14, with the road wheels 12 in rolling contact with a road surface 16, with at least one of the road wheels 12 being powered/driven. The actual number of road wheels 12 may vary with the particular configuration of the motor vehicle 10. That is, as few as one driven road wheel 12 is possible, for instance in the context of motorcycles, scooters, or electric bicycles/e-bikes, with two or more driven road wheels 12 being possible in other configurations, e.g., gasoline powered and/or electrically powered passenger or commercial sedans, crossover vehicles, sport utility vehicles, trucks, etc.

Within the scope of the present disclosure, the motor vehicle 10 is equipped with a plurality of lane localization input sensors and/or devices, hereinafter referred to as a lane localization suite 18 for simplicity. Collectively, the constituent components of the lane localization suite 18 provide input signals (arrow 30) to the controller 50 indicative of a relative position of the motor vehicle 10 with respect to/on a roadway having the road surface 16. The capabilities of the lane localization suite 18 are thus relied upon in real-time by the controller 50 when performing autonomous or semi-autonomous steering functions, such as but not necessarily limited to lane keep assist with lane departure warning, lane change assist, lane centering, etc.

The composition of the lane localization suite 18 will vary with the particular equipment configuration of the motor vehicle 10. Typically, however, the lane localization suite 18 will include or have access to at least a geocoded mapping database 22 and a GPS receiver 24, the latter of which receives GPS signals 25 from an orbiting constellation of GPS satellites (not shown), as is well understood in the art. Thus, the input signals (arrow 30) typically include geocoded mapping data and the GPS signals 25 from the respective geocoded mapping database 22 and GPS receiver 24, with the mapping data provided by such sources displayed to the driver of the motor vehicle 10 via a touch screen (not shown) or other suitable display arranged in a center stack or other convenient location within the motor vehicle 10, or on a similar touch screen of a smartphone or other portable electronic device.

Additionally, the lane localization suite 18 may include a video camera 20 and one or more remote sensing transceivers 26, e.g., a radar sensor and/or a lidar sensor. With respect to the video camera 20, such a device may be securely connected to the vehicle body 14 at a suitable forward-facing location thereof, such as behind a rearview mirror 17 attached to a windshield 19, to a dashboard (not shown), or at another application-suitable location providing good visibility of the roadway lying before the motor vehicle 10. The video camera 20 is configured to collect real-time video image data of the roadway, with the input signals (arrow 30) including the real-time video image data. The remote sensing transceiver(s) 26 in turn are configured to transmit electromagnetic energy at sensor-specific wavelengths toward a target as an interrogation signal, and to receive a reflected portion of the electromagnetic waveform from the target as a response signal. In FIG. 1, such interrogation and response signals are abbreviated WW for illustrative simplicity.

In addition to the video camera 20, the geocoded mapping database 22, the GPS receiver 24, and the remote sensing transceivers 26, the method 100 and controller 50 of FIG. 1 also selectively rely on the turn signal state of a turn signal lever 28 as an additional constituent component of the lane localization suite 18. As understood in the art, such a turn signal lever 28 is situated in close proximity to a steering wheel 29 of the motor vehicle 10. When a driver (DD) decides to change lanes or turn, the driver (DD) signals the direction of the impending maneuver by moving the turn signal lever 28 up or down. Within a corresponding turn signal circuit, which is omitted for illustrative simplicity, such activation of the turn signal lever 28 enables an electric current to energize a turn signal lamp 31 disposed at the various corners of the motor vehicle 10. Blinking action of the turn signal lamp 31, represented at TS in FIG. 1 for a representative left hand turn, visually alerts other drivers or pedestrians in proximity to the motor vehicle 10 of the impending turn direction. Thus, the turn signal state is selectively used herein, subject to certain entry conditions, as an additional available input to the controller 50 for the purpose of improving upon the fidelity of the lane localization function 51.

For the purposes of executing the method 100, the controller 50 shown schematically in FIG. 1 is equipped with application-specific amounts of the volatile and non-volatile memory (M) and one or more of processor(s) (P), e.g., microprocessors or central processing units, as well as other associated hardware and software, for instance a digital clock or timer, input/output circuitry, buffer circuitry, Application Specific Integrated Circuits (ASICs), systems-on-a-chip (SoCs), electronic circuits, and other requisite hardware as needed to provide the programmed functionality. The method 100 may be implemented in response to the input signals (arrow 30) through a computer-executable program of instructions, such as program modules, generally referred to as software applications or application programs executed by the controller 50 or variations thereof. The controller 50 may thereafter transmit output signals (arrow CCo) as part of the method 100, e.g., to a collection of Automated Driver Assistance System (ADAS) equipment 70.

Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on a variety of memory (M), such as but not limited to CD-ROM, magnetic disk, solid-state memory, etc. Similarly, the method 100 or parts thereof may be executed by a device other than the controller 50 and/or embodied in firmware or dedicated hardware in an available manner, such as when implemented by an ASIC, a programmable logic device, a field programmable logic device, discrete logic, etc.

Still referring to FIG. 1, as part of the present solutions, the controller 50 is equipped to execute a control action downstream of the disclosed lane localization probability determination described below. To that end, the ADAS equipment 70 may include, by way of example and not of limitation, a Lane Keep Assist (LKA) system 52 and a Lane Departure Warning (LDW) system 54, which may operate alone or in conjunction with each other in different situations. Electronic control and feedback signals (arrow 30-1 and arrow 30-2) may be exchanged between the controller 50, the LKA system 52, and the LDW system 54 in response to the method 100 as the controller 50 executes a dynamic control action. The input signals (arrow 30) thus may include the corresponding electronic control and feedback signals (arrow 30-1 and 30-2). The motor vehicle 10 may also be equipped with these or a number (N) of additional ADAS components, i.e., $ADAS_N$ 58, with corresponding electronic control and feedback signals (arrow 30-N) to enable the controller 50 to execute an autonomous steering control action, including a lane centering control maneuver, a driver-requested automatic lane change maneuver, and/or a system/controller 50-initiated automatic lane change maneuver.

Figure 2:
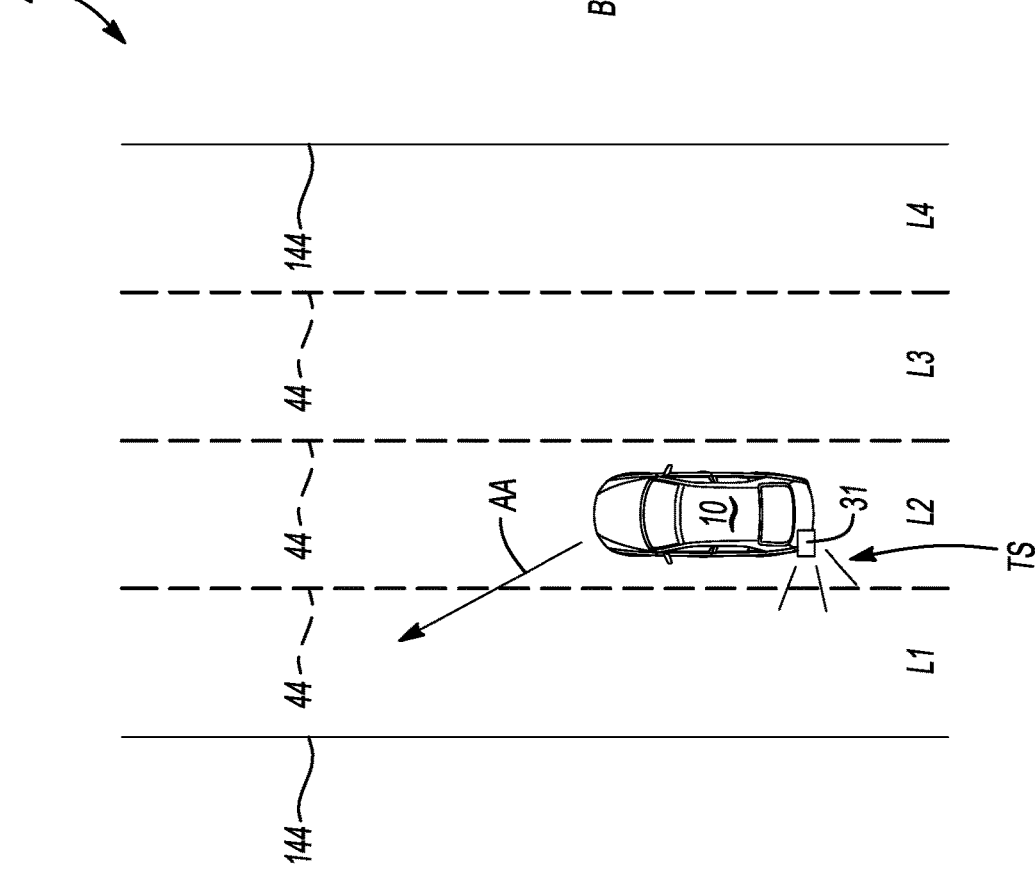
FIG. 2 is a plan view illustration of an exemplary lane change maneuver in which the motor vehicle of FIG. 1 activates a turn signal when initiating the lane change maneuver.

Referring now to FIG. 2, the motor vehicle 10 is depicted in the process of executing a representative lane change maneuver while traveling on multi-lane driving surface 40. In this instance, the multi-lane driving surface 40 is represented as a stretch of highway or freeway having four parallel lanes, i.e., L1, L2, L3, and L4, separated from each other by inner lane markings 44, in this instance broken-line and thus crossable in accordance with prevailing traffic laws. The outer boundaries of the driving surface are demarcated by outer lane markings/boundary lines 144. Such boundary lines 144 typically are solid to delineate the start of a shoulder at the edge of the multi-lane driving surface 40, but also may be other non-crossable lines, e.g., centerlines, or on inclines or hills, or on extended stretches of the multi-lane driving surface having limited forward visibility and/or obstructed views.

In the illustrated scenario, a driver of the motor vehicle 10 traveling in lane L2 may decide to merge into lane L1, e.g., in preparation for an upcoming offramp or when passing another vehicle. Such a lane change maneuver is indicated in FIG. 2 by arrow AA. The controller 50 of FIG. 1 may assist in this effort as part of an autonomous or semi-autonomous steering control maneuver. However, in order to do so the controller 50 requires accurate real-time data indicative of the present location of the motor vehicle 10 relative to the multi-lane driving surface 40 and its lanes L1, L2, L3, and L4. This determination is made automatically by the controller 50 based on a statistical probability analysis, as appreciated in the general art and described in further detail below. In accordance with the method 100, and to increase fidelity of the onboard lane localization function 51 of FIG. 1, the controller 50 selectively incorporates the activation state of the turn signal lever 28 of FIG. 1 into its lane localization calculations.

Referring to FIG. 3, an exemplary embodiment of the method 100 is described in terms of programmed steps or algorithm logic blocks ("blocks" for simplicity). Method 100 commences at block B102 ("REC 30") with the controller 50 of FIG. 1 receiving the input signals (arrow 30), inclusive of the electronic control and feedback signals (arrows 30-1, 30-2, . . . , 30-N of FIG. 1) and thus indicative of a relative position of the motor vehicle 10 with respect to a roadway, e.g., the multi-lane driving surface 40 of FIG. 2. In a possible implementation of the method 100, block B102 includes receiving GPS data and geocoded mapping data from the GPS receiver 24 and the mapping database 22, respectively, as part of the input signals (arrow 30). The method 100 proceeds to block B104 upon receipt of the input signals (arrow 30).

At block B104 ("TS-ENBL Cond?"), the controller 50 of FIG. 1 may determine whether certain turn signal-based fidelity enhancement enabling conditions are satisfied. Block B104 is used to ensure that the turn signal state of the turn signal lever 28 of FIG. 1 is used situationally, i.e., when appropriate and likely to be informative, and not when consideration of the turn signal information could reduce the accuracy of resident lane probability determinations of the lane localization function 51.

As part of the present method 100, the controller 50 of FIG. 1 may receive and evaluate an electronic signal indicative of activation state of the turn signal lever 28. Such a signal may be a current or voltage signal representing a left-hand or right-hand turn state of the turn signal lever 28, for example, or a measured or detected switch position indicative of the same. By way of example and not of limitation, the enabling conditions could include a determination by the controller 50 that a lane change was not recently detected in the present turn direction of the turn signal lever 28, or that a turn signal was not recently set in the opposite direction of the current turn signal direction. The controller 50 could also determine whether the turn signal lever 28 has been set in a particular direction for a calibratable amount of time, i.e., more than a minimum but less than maximum amount of time, e.g., by comparing an elapsed time in a given left or right turn state to the calibratable amount of time.

In an optional embodiment of the motor vehicle 10 in which an interior camera and/or other hardware and associated software evaluates and assigns a numeric score to a driver's attention level, e.g., a gaze-tracking camera collocated with the video camera 20 on the windshield 19 of FIG. 1 or mounted to a dashboard or other interior location of the motor vehicle 10, or sensor(s) tracking erratic steering or braking inputs indicative of reduced attention, such that the controller 50 is made aware of the driver's present attention level as a reported score, the enabling conditions could also include a threshold minimum driver attention score.

Still other exemplary enabling conditions usable as part of block B104 include a particular detected lane marker type. More particularly, the controller 50 could evaluate, for instance using resident image processing software, whether lines detected on the side of a lane L1, L2, L3, or L4 matching a turn signal direction of the turn signal lever 28 are dashed or another crossable line type, and/or that a line marker located one over from a side of the lane matching the direction of the turn signal is valid, i.e., is not a road edge corresponding to the boundary lines 144 of FIG. 2. Information such as whether an adjacent lane in the direction of the turn signal has an expected lane width within a calibrated tolerance may also be used, e.g., lane L1 of FIG. 2. Look-ahead data could likewise be used, such as information that a new lane is not being added on a side of the multi-lane driving surface 40 of FIG. 2 in a direction matching that of the turn signal within some predetermined distance. The method 100 proceeds to block B105 when such turn signal fidelity enhancement enabling conditions are not satisfied, and to block B106 in the alternative.

At block B105 ("DISBL $CC_{TS}$"), the controller 50 temporarily disables use of the turn signal state by preventing its use in the lane localization function 51, with "$CC_{TS}$" shown in FIG. 3 to abbreviate lane localization-based control in accordance with turn signal state information. The method 100 proceeds to block B106 with turn signal-based fidelity enhancement disabled.

Block B106 ("CALC Bel($L_T$=1)") includes calculating multiple lane probability distributions using the lane localization function 51 shown in FIG. 1, i.e., using the control and feedback signals (arrows 30-1, 30-2, . . . , 30-N). When block B106 is arrived at from block B104 directly, such signals will include the electronic turn signal triggered by actuation of the turn signal lever 28. Block B106 also includes automatically fusing the lane probability distributions, again via the lane localization function 51, to thereby generate a host lane assignment of the motor vehicle 10. Various fusing techniques could be used to this end, including weighting the various lane probability distributions in a particular manner. As appreciated in the art, the resulting host lane assignment corresponds to a lane of the roadway having a highest probability among a set of possible lane assignments.

With respect to lane localization and its related statistical probability analysis, in general the controller 50 performs real-time calculation of the probability of the motor vehicle 10 being present in a particular lane at a given moment in time. Referring briefly again to FIG. 2, for example, such a calculation would result in a lane probability for each respective one of the representative lanes L1, L2, L3, and L4, for each sensor or combinations thereof in the lane localization suite 18 of FIG. 1. Various localization algorithms may be used to such ends, including but not limited to Markov localization, Monte Carlo localization, etc. In terms of application, available sensor updates may be applied in the same way for each sensor type by multiplying the current probability distribution by a prior distribution/prior belief, and then normalizing to derive an updated probability distribution as a new belief.

Figure 4:
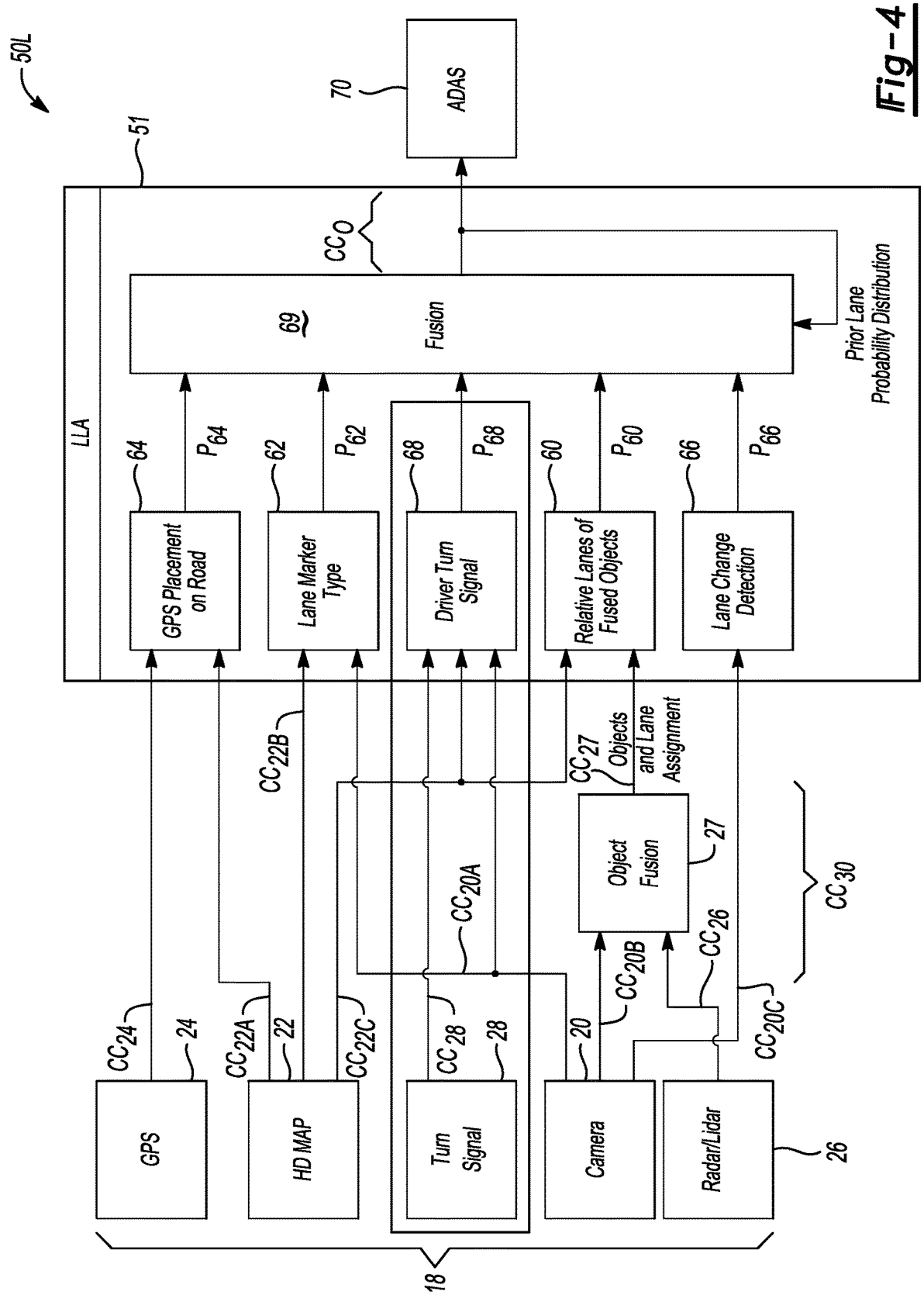
FIG. 4 is a schematic logic flow diagram of exemplary control logic usable by the motor vehicle of FIG. 1.

Precisely how a given input probability distribution ($P(_{ST}|l)$) is calculated in a given application may differ depending on the sensor being considered, i.e., the various sensors or components in the lane localization suite 18 of FIG. 1. The logic 50L of FIG. 4 illustrates one possible implementation as explained below. For example, the distribution probability based on a GPS input from the GPS receiver 24 shown in FIG. 1 may assign a higher priority to detected lanes lying closer to a GPS prediction. For lane marker inputs, lanes having the best/most lane marker type matches to lane markers detected by the video camera 20 will likewise have a higher probability, whereas lanes with fewer/poorer matches will have a lower probability.

For the turn signal indication contemplated herein for the purposes of increasing fidelity of the lane localization function 51, lanes meeting the criteria of having an adjacent available lane in the direction of the turn signal, for instance indicating that a lane is present on the left of the motor vehicle 10 when the turn signal lever 28 is used to signal a left hand turn, are given a higher probability than lanes that do not meet this criteria. The exact number of a high or low probability result may be tunable in order to adjust weight of a given sensor or sensor input. Once a given sensor input distribution is calculated, it may be applied in the same way as other available sensor inputs to produce a final belief/probability distribution.

As part of block B106 of FIG. 3, when turn signal-based fidelity enhancement is enabled, the controller 50 next calculates the lane probability based on the turn signal $P(S_T|l)$ given each lane (l), e.g.:

$$\text{Belief}(L_T = l) = \alpha_T P(s_T | l)\text{Belief}(L_{T-1} = l)$$

$$P(s_T | l) = \begin{cases} 1, & \forall\, l \text{ with an adjacent lane in direction of turn signal} \\ x, & \forall\, l \text{ with no adjacent lane in direction of turn signal} \end{cases}$$

where $S_T$ is the turn signal direction at time T, and $L_T$ is the set of available lanes at time T, e.g., Lanes L1, L2, L3, and L4 of FIG. 2.

Figure 5:
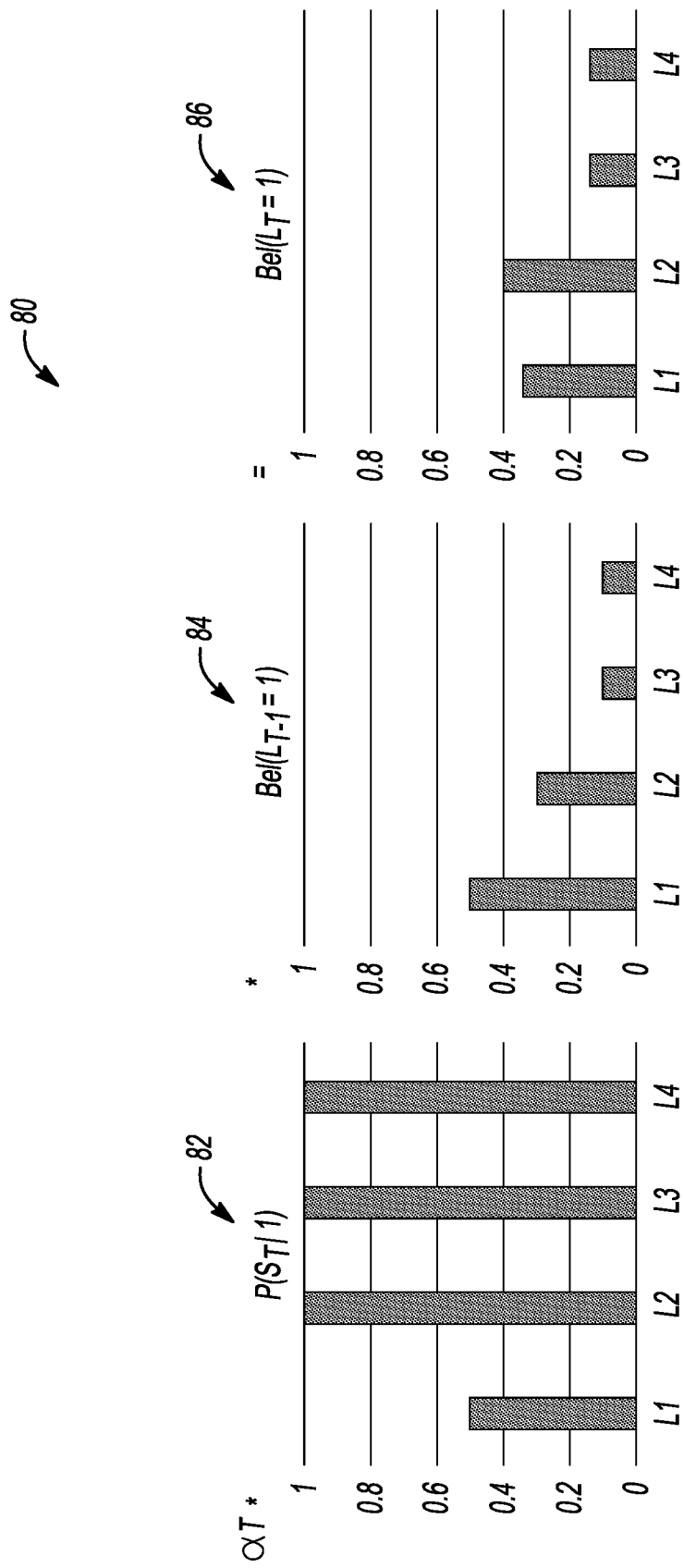
FIG. 5 is a representative series of probability distributions describing an example application of the use of turn signal when performing a lane localization function aboard the motor vehicle shown in FIG. 1.

Referring briefly to the representative probability sequence 80 of FIG. 5, a probability distribution 82 exists for lanes L1-L4, with the probability score ranging from 0 (extremely unlikely) to 1 (highly likely) for each lane L1, L2, L3, and L4. For a sensor update calculation, e.g., for the turn signal, the controller 50 calculates:

$$\text{Belief}(L_T = l) = \alpha_T P(s_T | l)\text{Belief}(L_{T-1} = l)$$

$$P(s_T | l) = \begin{cases} 1, & \forall\, l \text{ with an adjacent lane in direction of turn signal} \\ x, & \forall\, l \text{ with no adjacent lane in direction of turn signal} \end{cases}$$

The probability distribution 82 from a sensor update is then applied to the prior probability distribution 84 at time T−1, i.e., Belief($L_T$−1=1). Thus, the controller 50 multiples the probability distributions 82 and 84 together to calculate an updated probability distribution 86, i.e., Belief($L_T$=1), at the present time T. The effect in the representative scenario of FIG. 5 is that, at time T−1, lane L1 is returned as the most probable lane, with a normalized probability of about 0.5 in this illustrative example. One iteration of the method 100 enhanced by turn signal information, however, results in the updated probability distribution 86 in which lane L2 is now identified as the most probable lane. As a result, the new host lane assignment using turn signal information would be lane L2, with the controller 50 using this new lane assignment as a basis for executing a number of possible autonomous steering control actions.

Referring again to FIG. 3, block B108 ("EXEC CA") in the depicted exemplary embodiment of the method 100 includes executing an autonomous steering control action aboard the motor vehicle 10, via the controller 50 of FIG. 1, in response to the host lane assignment determined in block B106. Exemplary steering control actions taken as part of block B108 may include one or more of a lane centering control maneuver, a driver-requested automatic lane change maneuver, and/or a system-initiated automatic lane change maneuver, among other possible control actions.

Execution of the method 100 described above could be facilitated using the representative control logic 50L as depicted schematically in FIG. 4. The various components or sensors of the lane localization suite 18 receive the above-noted input signals 30 of FIG. 1, here represented as $CC_{30}$ from the video camera 20, the geocoded mapping database 22 ("HD Map"), the GPS receiver 24 ("GPS"), the remote sensing transceivers 26 ("Radar/Lidar"), and the turn signal lever 28 ("Turn Signal"). Corresponding output signals from each constituent sensor of the lane localization suite 18 are transmitted to the lane localization function 51 ("LLA").

In a possible signal configuration, for example, the video camera 20 may output camera data $CC_{20B}$ indicative of detected lane marker types, camera data $CC_{20A}$ indicative of the presence, size, and shape of, and range to detected objects in proximity to the motor vehicle 10, and camera data $CC_{20C}$ indicative of lateral positions of detected broken or solid line lane markers, e.g., lines 44 and 144 of FIG. 2, respectively. The geocoded mapping database 22 outputs lane data $CC_{22A}$, such as the GPS location and width of detected lanes, lane marker data $CC_{22B}$ indicative of detected lane marker types, and lane layout data $CC_{22C}$ indicative of a detected lane layout. The GPS receiver 24 likewise outputs GPS position data $CC_{24}$ as a present GPS position of the motor vehicle 10. Remaining data may include remote sensing data $CC_{26}$ from the remote sensing transceivers 26 indicative of the positions and range to radar and/or lidar-detected objects, while turn signal data $CC_{28}$ from the turn signal lever 28 are indicative of an impending righthand turn, left hand turn, or lane change direction.

The lane localization function 51, i.e., an encoded or programmed implementation of the present method 100, is thereafter used to generate multiple lane probability distributions. Specifically, logic blocks 60, 62, 64, 66, and 68 may be used to independently generate corresponding sensor-specific probability distributions, which are then collectively processed via a fusion block 69 ("Fusion") to generate the above-noted host lane assignment. The ADAS equipment 70 is then informed by the host lane assignment, with the controller 50 thereafter executing a corresponding control action aboard the motor vehicle 10 of FIG. 1 using the ADAS equipment 70 based on the host lane assignment.

Logic block 60 may receive fused object data $CC_{27}$ from an object fusion block 27 and lane layout data $CC_{22C}$ from the geocoded mapping database 22, and then output a lane probability distribution (arrow $P_{60}$) indicative of relative lanes of fused objects versus a map-based lane layout. In terms of data fusion at block 27, which in general may be implemented in an analogous manner to implementation of the fusion block 69 described below, various possibilities exist within the scope of the disclosure, including fusing video image data, radar data, and/or lidar data, i.e., any or all available sensor data depending on sensor availability and application requirements. Logic block 62 similarly may determine a lane probability distribution (arrow $P_{62}$) indicative of lane marker type using the video camera 20 and the geocoded mapping database 22. Likewise, logic block 64 may produce a lane probability distribution (arrow $P_{64}$) indicative of the GPS location of the motor vehicle 10, while logic block 66 produces a lane probability distribution (arrow $P_{66}$) based on a detected lane change informed solely by the video camera 20. To account for turn signal information, the logic block 68 produce a lane probability distribution (arrow $P_{68}$) based solely on the state of the turn signal lever 28 of FIG. 1.

As noted above, sensor updates are applied in the same way, i.e., by multiplying probability distributions by a prior belief and thereafter normalizing to produce a new belief. Input probability distributions, e.g., $P_{60}$, $P_{62}$, $P_{64}$, $P_{66}$, $P_{68}$ in FIG. 4, are calculated differently based on the particular sensor(s) being used. Using the turn signal lever 28 as an input, for instance, lanes having criteria of an adjacent available lane in the direction of the turn signal maybe given a higher priority at logic block 68. In fusion block 69, the relative weight of each input can be assigned as a calibratable value to produce a desired control result for the ADAS equipment 70.

Those skilled in the art will appreciate that, by using the present method 100, the fidelity of the lane localization function 51 may be situationally improved aboard the motor vehicle 10 of FIG. 1 having the turn signal lever 28, and similar mobile systems. By generating turn signal-based lane probability distributions informed by the state of the turn signal lever 28, the controller 50 of FIG. 1 is able to generate a host lane assignment of the motor vehicle 10 in a more accurate manner. While generation of the host lane assignment by the controller 50 is a logical change of state having various benefits, including enabling a possible real-time depiction of the relative position of the motor vehicle 10 on a heads-up display screen (not shown) of the motor vehicle 10, dynamic control actions are also enabled. For example, the controller 50 may command an autonomous steering control action in response to the turn signal-based host lane assignment, or the controller 50 may perform a variety of other dynamic control actions informed thereby. These and other benefits will be readily appreciated by one skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for performing a lane localization function aboard a motor vehicle having a turn signal lever, the method comprising:
   receiving GPS data and geocoded mapping data, via a controller, together indicative of a relative position of the motor vehicle with respect to a roadway;
   in response to enabling conditions, receiving an electronic turn signal indicative of a present activation state of the turn signal lever, wherein the GPS data, the geocoded mapping data, and the present activation state of the turn signal lever collectively form a set of input signals;
   in response to the set of input signals, calculating a plurality of lane probability distributions via the controller using the lane localization function;
   automatically fusing the plurality of lane probability distributions, via the lane localization function, to thereby generate a host lane assignment of the motor vehicle, wherein the host lane assignment corresponds to a lane of the roadway having a highest probability among a set of possible lane assignments;
   executing an autonomous steering control action aboard the motor vehicle in response to the host lane assignment, via the controller using an Advanced Driver Assistance System (ADAS);
   wherein the motor vehicle includes a video camera configured to collect real-time video image data of the roadway;
   receiving the real-time video image data, via the controller, as part of the set of input signals; and
   determining a lane marker type via the controller using the real-time video image data of the roadway, wherein the enabling conditions includes a predetermined lane marker type on a side of a lane matching a direction of the turn signal lever.

2. The method of claim 1, wherein the motor vehicle also includes a radar system and/or a lidar system respectively configured to collect radar data or lidar data of the roadway, the method further comprising receiving the radar data and/or the lidar data as part of the set of input signals.

3. The method of claim 2, further comprising automatically fusing the radar data and/or the lidar data with the real-time video image data using an object fusion logic block of the controller.

4. The method of claim 1, wherein the lane localization function includes a Markov localization function, and wherein calculating the plurality of lane probability distributions includes using Markov localization function.

5. The method of claim 1, wherein the enabling conditions includes a lane change value indicative of an elapsed time since a detected lane change in a direction of the electronic turn signal and/or an elapsed time since the electronic turn signal has been set in a particular direction.

6. The method of claim 1, further comprising:
   determining a driver attention score via the controller, wherein the enabling conditions includes the driver attention score exceeding a calibrated threshold attention score.

7. The method of claim 1, wherein the enabling conditions includes a look-ahead value indicative of an existence of and/or an estimated width of an upcoming lane of the roadway.

8. The method of claim 1, wherein executing the autonomous steering control action includes executing one or more of a lane centering control maneuver, a driver-requested automatic lane change maneuver, and/or a system-initiated automatic lane change maneuver.

9. A motor vehicle comprising:
   a vehicle body;
   a set of road wheels connected to the vehicle body;
   a turn signal lever configured to generate an electronic turn signal;
   an Advanced Driver Assistance System (ADAS) configured to control a dynamic state of the motor vehicle based on a host lane assignment; and
   a controller configured to execute instructions for performing a lane localization function aboard the motor vehicle using the electronic turn signal, wherein the controller is configured to:
   receive a set of input signals indicative of a relative position of the motor vehicle with respect to a roadway, the set of input signals including GPS data and geocoded mapping data;
   in response to enabling conditions, receive the electronic turn signal as part of the set of input signals, the electronic turn signal being indicative of a present activation state of the turn signal lever;
   calculate multiple lane probability distributions, via the lane localization function, using the set of input signals;
   automatically fuse the lane probability distributions, via the lane localization function, to thereby generate the host lane assignment, wherein the host lane assignment corresponds to a lane of the roadway having a highest probability among a set of possible lane assignments;
   execute an autonomous steering control action aboard the motor vehicle in response to the host lane assignment using the ADAS;

wherein the motor vehicle includes a video camera configured to collect real-time video image data of the roadway, and wherein the set of input signals include the real-time video image data; and wherein the controller is configured to determine a lane marker type via the controller using the real-time video image data of the roadway, wherein the enabling conditions includes a predetermined crossable lane marker type on a side of a lane matching a direction of the electronic turn signal.

10. The motor vehicle of claim 9, further comprising a radar system and/or a lidar system configured to collect radar data and/or lidar data of the roadway, respectively, as part of the set of input signals, and wherein the controller is configured to automatically fuse the radar data and/or the lidar data together or with other sensor data using an object fusion logic block.

11. The motor vehicle of claim 9, wherein the enabling conditions includes a lane change value indicative of an elapsed time since a detected lane change in the direction of the electronic turn signal and/or an elapsed time since the electronic turn signal has been set in one direction.

12. The motor vehicle of claim 9, wherein the controller is configured to determine a driver attention score, wherein the enabling conditions includes the driver attention score exceeding a calibrated threshold attention score.

13. The motor vehicle of claim 9, wherein the enabling conditions includes a look-ahead value indicative of an existence of and/or an estimated width of an upcoming lane of the roadway.

14. The motor vehicle of claim 9, wherein the autonomous steering control action includes a lane centering control maneuver, a driver-requested automatic lane change maneuver, and/or a controller-initiated automatic lane change maneuver.

15. A computer-readable medium on which is recorded instructions for selectively increasing fidelity of a lane localization function aboard a motor vehicle having a turn signal lever, wherein the instructions are selectively executed by a processor of the motor vehicle in response to a set of fidelity enhancement enabling conditions to thereby cause the processor to:

receive an electronic turn signal indicative of a present activation state of the turn signal lever, wherein the electronic turn signal is part of a set of input signals;

receive GPS data and geocoded mapping data, as part of the set of input signals and indicative of a relative position of the motor vehicle with respect to a roadway;

calculate a plurality of lane probability distributions, via the lane localization function, using the set of input signals;

automatically fuse the plurality of lane probability distributions, via the lane localization function, to thereby generate a host lane assignment of the motor vehicle, wherein the host lane assignment corresponds to a lane of the roadway having a highest probability among a set of possible lane assignments;

transmit control signals to an Advanced Driver Assistance System (ADAS) of the motor vehicle in response to the host lane assignment to thereby perform an autonomous steering control action of the motor vehicle, including one or more of a lane centering control maneuver, a driver-requested automatic lane change maneuver, and/or a system-initiated automatic lane change maneuver; and wherein the enabling conditions includes a detected predetermined crossable lane marker type on a side of a lane matching an activation direction of the turn signal lever.

16. The method of claim 1, further comprising determining whether a turn signal-based fidelity enhancement enabling condition is satisfied, which includes using the present activation state of the turn signal lever when the present activation state is informative.

17. The method of claim 1, wherein executing the autonomous steering control action includes executing a lane centering control maneuver.

18. The method of claim 1, wherein executing the autonomous steering control action includes executing a lane centering control maneuver, a driver-requested automatic lane change maneuver, and a system-initiated automatic lane change maneuver.

19. The method of claim 1, further comprising assigning a calibrated value to a plurality of inputs to produce a control result of the ADAS, wherein one of the inputs includes using the turn signal lever.

20. The motor vehicle of claim 9, wherein the controller configured to execute the autonomous steering control action includes the controller configured to execute a lane centering control maneuver.

* * * * *